United States Patent [19]

Kalogeros

[11] Patent Number: 4,659,289
[45] Date of Patent: Apr. 21, 1987

[54] TURBINE SIDE PLATE ASSEMBLY

[75] Inventor: Robert R. Kalogeros, Glastonbury, Conn.

[73] Assignee: United Technologies Corporation, Hartford, Conn.

[21] Appl. No.: 633,722

[22] Filed: Jul. 23, 1984

[51] Int. Cl.⁴ .................. F01D 5/06; F01D 11/02
[52] U.S. Cl. .................. 416/198 A; 416/193 A; 415/172 A
[58] Field of Search .......... 416/95, 193 A, 198 A, 416/200 A, 201 R, 220 R, 221; 415/199.5, 172 A

[56] References Cited

U.S. PATENT DOCUMENTS

| | | | |
|---|---|---|---|
| 2,452,782 | 11/1948 | McLeod et al. | 416/201 R |
| 2,656,147 | 10/1953 | Brownhill et al. | 416/97 R |
| 2,996,280 | 8/1961 | Wilson | 416/201 X |
| 3,094,309 | 6/1963 | Hull et al. | 416/201 |
| 3,137,478 | 6/1964 | Farrell | 416/220 R |
| 3,295,825 | 1/1967 | Hall | 416/193 A |
| 3,575,522 | 4/1971 | Melenchuk | 416/193 A X |
| 3,733,146 | 5/1973 | Smith et al. | 415/172 |
| 3,801,220 | 4/1974 | Beckershoff | 416/198 A |
| 3,836,279 | 9/1974 | Lee | 415/172 A |
| 3,842,595 | 10/1974 | Smith et al. | 416/198 A X |
| 4,035,102 | 7/1977 | Maghon | 416/198 A X |
| 4,127,359 | 11/1978 | Stephan | 416/198 A |
| 4,171,930 | 10/1979 | Brisken et al. | 416/193 A X |
| 4,192,633 | 3/1980 | Herzner | 416/220 R X |
| 4,466,239 | 8/1984 | Napoli et al. | 415/172 A |
| 4,470,757 | 9/1984 | Vollinger | 416/220 R X |
| 4,484,858 | 11/1984 | Kurosawa et al. | 416/201 R X |
| 4,507,052 | 3/1985 | Thompson | 416/193 A |

FOREIGN PATENT DOCUMENTS

| | | | |
|---|---|---|---|
| 2555911 | 6/1977 | Fed. Rep. of Germany | 416/201 R |
| 157966 | 2/1957 | Sweden | 416/198 A |
| 790029 | 1/1958 | United Kingdom | 416/198 A |
| 988541 | 4/1965 | United Kingdom | 416/198 A |
| 1546783 | 5/1979 | United Kingdom | 416/201 R |

Primary Examiner—Everette A. Powell, Jr.
Attorney, Agent, or Firm—Norman Friedland

[57] ABSTRACT

The sole support for the rear disk rim side plate of the 1st turbine stage is the seal extending between the 1st and 2nd stage turbines. The fir tree broach on the side plate fits into the broached rim of the turbine disk which is extended axially to radially restrain each side plate. This configuration eliminates the heretofore used bolts and nuts or rivets.

3 Claims, 3 Drawing Figures

TURBINE SIDE PLATE ASSEMBLY

CROSS REFERENCE

This invention is related to the inventions disclosed in copending patent applications entitled BREACH LOCK ANTI-ROTATION KEY, Ser. No. 633,721, ROTATING SEAL FOR GAS TURBINE ENGINE Ser. No. 633,723, and TURBINE COVER-SEAL ASSEMBLY, Ser. No. 633,727, filed by Robert R. Kalogeros, Gary P. Peters, and Robert R. Kalogeros and Gary F. Chaplin, respectively on even date and all assigned to the same assignee of this application.

DESCRIPTION

1. Technical Field

This invention relates to turbines for gas turbine engines and particularly to side plates that fit each of the broached recesses on the turbine disk at the juncture where the turbine blades are supported to the disk and the restraints therefor.

2. Background Art

The patent application entitled ROTATING SEAL FOR GAS TURBINE ENGINE filed by Gary Paul Peters on even date, supra discloses an invention that constitutes an improvement over the lenticular seal disclosed and claimed in U.S. Pat. No. 3,733,146 granted to S. L. Smith & P. E. Voyer on May 15, 1973 and assigned to the same assignee as this patent application. This patent discloses a toroidally shaped seal disposed between the 1st and 2nd turbine and is lenticular in cross section. Essentially, the inner and outer curved plates form an elliptical body that has its narrow ends abut against the adjacent disks of the turbines or the side plates thereof. This, in fact, forms a point attachment in cross section, and a circumferential edge attachment in full, being supported radially by the turbine disks and transmitting the axial load through both curved plates. In operation, the plates achieved their results, that is, net reduced stress, by virtue of the bending of the plates. Obviously, the higher the bending loads the heavier the plates have to be so as to tolerate the higher bending stresses. The seal disclosed in the patent application, supra, is an "I" Beam shaped, in cross section seal, where the outer rim spans between adjacent stages of turbines and engage the disks in a judicial manner.

In the type of turbine/seal construction disclosed in the U.S. Pat. No. 3,733,146 supra, it is typical to include a side plate on the rear face of the turbine adjacent the juncture where the root of the blade fits into the broached recess in the turbine disk. The side plates are a plurality of fir tree shaped flat elements (one for each blade) that are spaced around the circumference of the disk. In these heretofore designs each side plate is supported to the disk by a nut/bolt and plate assembly as illustrated in FIG. 1. The turbine blade 110 fits into a fir tree broached recess formed in the turbine disk 112. In this prior art construction the side plate 114, serving as a cover plate for this juncture between the root of blade 110 and disk 112, is nested under the head 116 of the nut 118 threaded to the bolt 120 extending through axial hole 122 formed in disk 112. The end remote from the bolt 120 of side plate 114 is nested in the space between the face of disk 112 and its axially extending lug 124. Obviously, this construction requires a bolt and nut assembly and lug for each of the side plates.

I have found that I can obviate this complex construction and eliminate the nut/bolt assemblies and lugs, resulting in a simplified construction requiring less assembly time, less number of component parts, less weight and lower costs, and reduce the leakage of turbine cooling air. Each side plate underlies the edge of the seal and in accordance with this invention the outer rim of the "I-Beam" construction engages the lower edge of each of the side plates to afford the axial restraint and a widened portion of the disk engages the inner end of the side plates to afford the radial restraint.

DISCLOSURE OF INVENTION

An object of this invention is to provide an improved side plate and restraint for the rear side plate of a turbine in a gas turbine engine. A feature of this invention is to utilize the seal between turbine stages to lock in the side plates and consequently eliminate the use of nuts and bolts and the like. This invention is characterized as being lighter in weight, easier to assemble, decrease turbine cooling air leakage, and less expensive than heretofore designs while eliminating a number of component parts that were heretofore necessary in heretofore designs.

Other features and advantages will be apparent from the specification and claims and from the accompanying drawings which illustrate an embodiment of the invention.

BEST MODE FOR CARRYING OUT THE INVENTION

Figure 1:
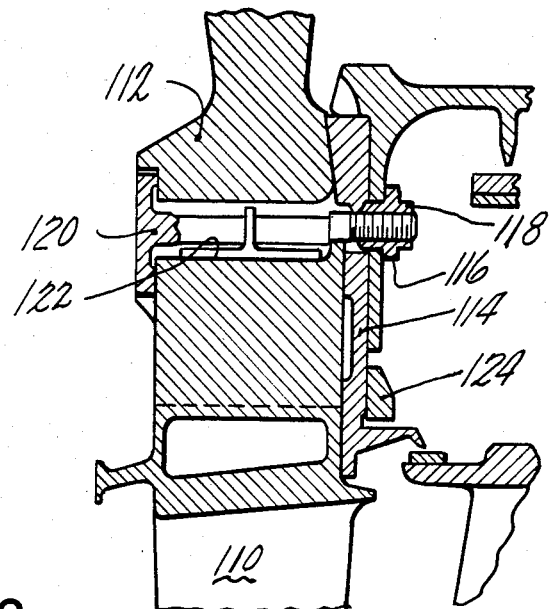
FIG. 1 is a partial view in cross section of a prior art design of the rear side plate and its retention.

This invention is particularly suitable as the rear side plate for the 1st turbine stage of a gas turbine power plant such as the engine models JT-9D, PW2037 and PW4000 manufactured by Pratt & Whitney Aircraft of United Technologies Corporation, the assignee of this patent application, the details of which are incorporated herein by reference. As best seen from FIGS. 2 & 3, the first stage turbine generally illustrated by reference numeral 10 comprises a rotor disk 12 and a plurality of circumferentially spaced turbine blades 14 (only a portion being shown) suitably supported thereby. Likewise, the 2nd stage turbine generally illustrated by reference numeral 16 comprises a rotor disk 18 and a plurality of circumferentially spaced blades 20 (only a portion being shown) suitably supported thereby. Although not shown, it will be appreciated that both the 1st and 2nd stage turbines are coupled to a common shaft (not shown) and serve to extract energy from the engine's fluid working medium and transfer said energy in terms of R.P.M. to the engine's shaft.

As noted, the I-Beam (in cross section) seal generally indicated by reference numeral 22 comprises an outer rim 24 spanning between the rear of the disk 12 and the front of disk 18 and is configured so that the general shape is generally concentric to the engine's centerline. Annular O-type seals 26 and 28 bear against the axial projections 30, and 32 respectfully to minimize leakage from the gas path that is outboard of the seal in the vicinity of the blades 14 and 20.

From the foregoing it is apparent that the rim 24 together with "O" seals 26 and 28 serve to seal the cavity 34 from the engines working fluid medium. Leakage around the blades adjacent the stator 36 are minimized by the labyrinth seals 38, 40 and 42. Similar to the lenticular seal in the U.S. Pat. No. 3,733,146, supra, the knife edges bear against the complimentary lands formed from honeycomb material when in the rotating mode and serve the same sealing function. Labyrinth seals are well known and are not a part of this invention.

As noted above, the upper rim 24 not only serves to support the knife edges of the labyrinth seal it provides axial stiffness to the 2nd stage turbine so as to tune it for the vibrating field to which it is subjected.

The inner rim 52 is slightly coned to form a convexed surface, the outer edges 54 and 56 underlie axial projections 58 and 60 and are snapped into place upon assembly. A flat annular plate or disk 62 support the inner rim and outer rim and in cross section resemble an "I⇌ Beam. The rim 52 serves to take up the radial loads passing some of the radial stresses through the disks via the axial projections 58 and 60 and some through the flat plate 62. The flat plate 62 by virtue of this construction serves to minimize or control the growth of the knife edges on the outer rim 24.

The radial restraints 54 and 56 also serve to control the average tangential stress in the seal 22 for burst considerations and control local tangential stress for low cycle fatigue considerations.

The dimensions between the axial projection 60 on turbine disk 18 and the restraint 56 is selected to allow a leakage path from cavity 34 into the cavity between flat plate 62 and turbine disk 18 so as to balance the pressure across the flat plate 62. Obviously, because the cavity between plate 62 and the first turbine is in proximity to the first turbine where the pressure is highest, it tends to see a higher pressure than that which is on the opposing side. The gap provided adjacent restraint 56 tends to bleed pressure therein so as to balance these forces. While not preferred, this pressure differential could be alleviated further by locating holes within flat plate 62 itself.

Antirotation lugs 70 formed on disks 12 and 72 formed on rim 52 cooperate to prevent relative rotation to the turbine disks and seal in the event of a malfunction. The lenticular seal described in U.S. Pat. No. 4,332,133 supra contained a similar function.

Figure 3:
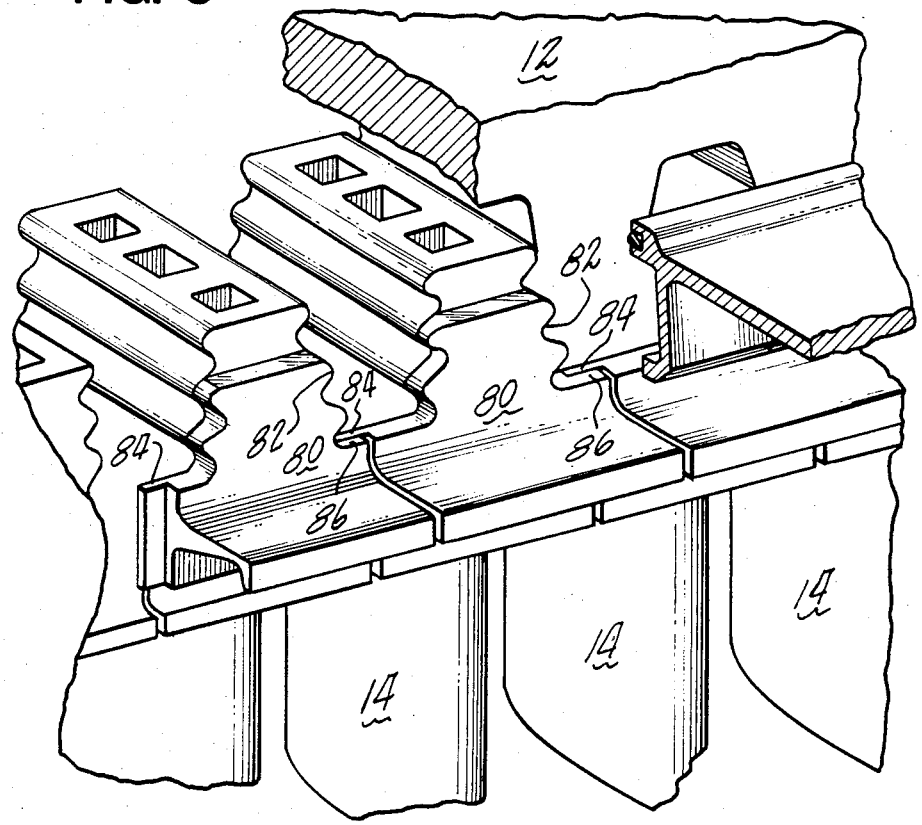
FIG. 3 is a partial view in perspective illustrating several of the side plates in their assembled position.
Figure 2:
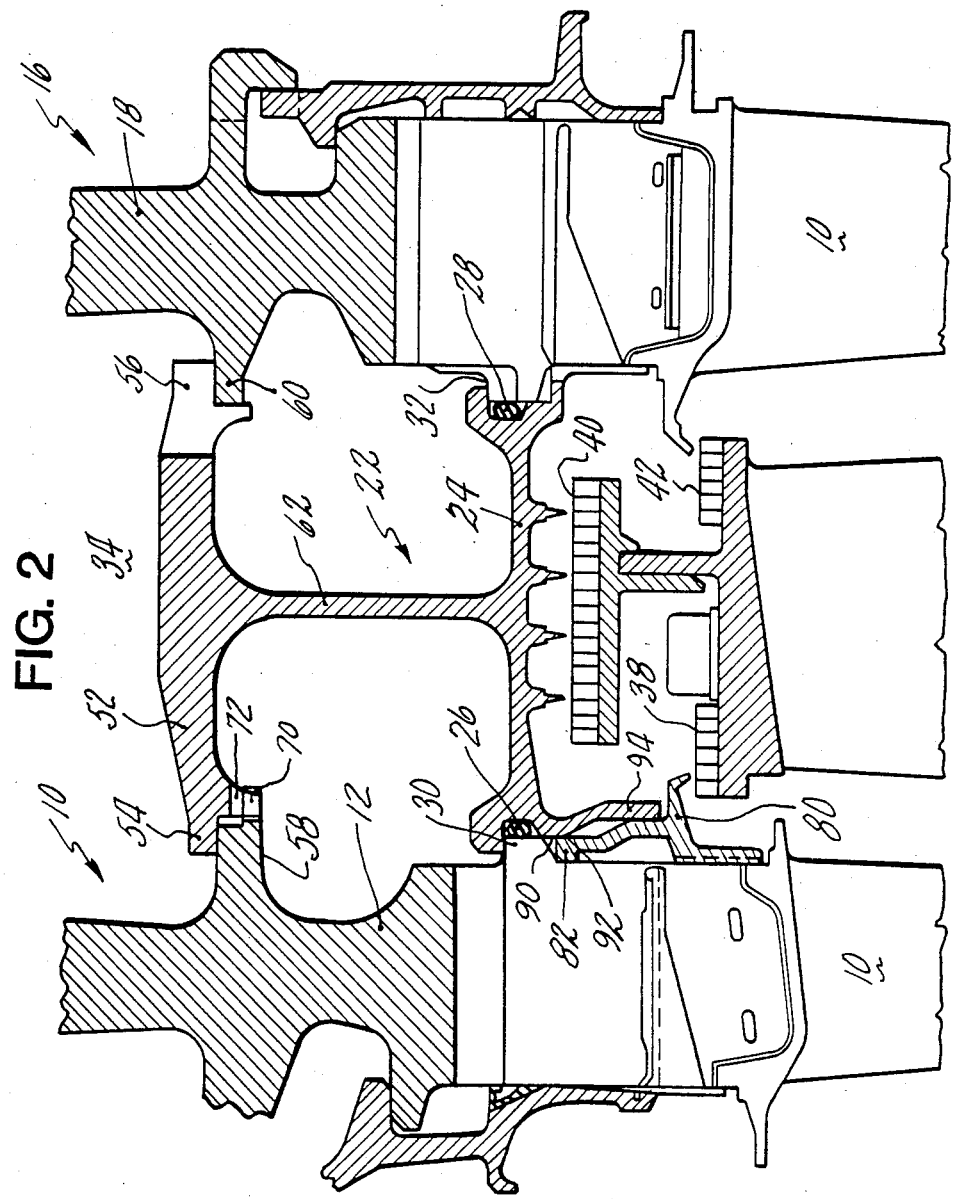
FIG. 2 is a partial view of the 1st and 2nd stages of the turbine of a gas turbine engine in cross section showing the improved rear side plate and its retention system.

According to this invention and as best seen from FIGS. 2 and 3 the rear side plates 80 are nested into the fir tree support of the overhang portion 30 of disk 12 which serves as the radial restraint. Each of the side plates 80, there being one for each blade, is formed from a generally flat element having a fir tree shaped portion 82 that is sized to fit into the fir tree slot of the disk that is supporting the turbine blade. The side edges 84 and 86 are dovetailed to mate with adjacent side plates. Obviously, each side plate 80 is assembled end to end to circumscribe the disk 12 at the juncture where the blade fits into the disk. As best seen in FIG. 2. The outer edge of the outer rim 24 abuts against the face of each of the rear side plates 80 at the lower edge 92 to provide the axial restraint. The hammer head 94 extending from rim 24 may provide additional restraint during rotation of the engine. In operation the centrifugal load occasioned by the hammer head 90 being properly dimensioned exerts an additional load during this regime to assure that the rear side plates 80 remain in place during the entire engine's operating envelope. Obviously, these radial and axial restraints are the only mechanical connections that retain each of the rear side plates 80 in position.

It should be understood that the invention is not limited to the particular embodiments shown and described herein, but that various changes and modifications may be made without departing from the spirit and scope of this novel concept as defined by the following claims.

I claim:

1. A pair of axially spaced turbine rotors for a gas turbine power plant, each of said turbine rotors comprising a disk and a plurality of tubine blades circumferentially supported in recesses formed on the outer diameter of said disk and the recesses having side edges, each of said turbine rotors having a front face and a rear face, a plurality of circumferentially spaced side plates mounted on the rear face of one of said turbine rotors contiguous with said disk and each of said blades at the side edge of said recesses to form an axial seal at the junction where said blades are attached to said disk, sealing means including a rigid annular support member extending between said rear face of one of said pair of turbine rotors and a front face of the other of said pair of turbine rotors and said annular support member bearing against the front surface of each of said side plates for axially supporting each of said side plates, said rigid annular support member being the sole means for securing said plurality of side plates in position.

2. For a gas turbine power plant as in claim 1 wherein said recess is a fir tree shaped receptacle, each of said blades at their roots being complementary shaped in a fir tree dimension to fit into said recess, and each of said circumferentially spaced side plates having a complementary fir tree shaped portion fitting into said recess adjacent said roots of said blades.

3. For a gas turbine power plant as in claim 2 wherein said disk extends laterally with respect to the circumferentially side spaced plates to restrain said side plates radially.

* * * * *